(12) United States Patent
Campbell et al.

(10) Patent No.: US 12,043,383 B2
(45) Date of Patent: Jul. 23, 2024

(54) TRANSPORT SYSTEM

(71) Applicant: BMT LIMITED, London (GB)

(72) Inventors: James Campbell, Bath (GB); Jake Rigby, Bath (GB); Ross Mansfield, Bath (GB); Alistair Frizell, Bath (GB); Ky Wilcockson, Bath (GB)

(73) Assignee: BMT LIMITED, London (GB)

( * ) Notice: Subject to any disclaimer, the term of this patent is extended or adjusted under 35 U.S.C. 154(b) by 241 days.

(21) Appl. No.: 17/612,414

(22) PCT Filed: May 21, 2020

(86) PCT No.: PCT/EP2020/064224
§ 371 (c)(1),
(2) Date: Nov. 18, 2021

(87) PCT Pub. No.: WO2020/234427
PCT Pub. Date: Nov. 26, 2020

(65) Prior Publication Data
US 2022/0204162 A1    Jun. 30, 2022

(30) Foreign Application Priority Data

May 23, 2019 (GB) ................................. 1907302

(51) Int. Cl.
*B64C 39/02* (2023.01)
*B64C 27/08* (2023.01)
(Continued)

(52) U.S. Cl.
CPC ............ *B64C 39/024* (2013.01); *B64C 27/08* (2013.01); *B64D 1/10* (2013.01); *B64D 1/22* (2013.01);
(Continued)

(58) Field of Classification Search
CPC ......... B64C 39/024; B64C 27/08; B64D 1/10; B64D 1/22; B64D 1/60; B64D 1/02;
(Continued)

(56) References Cited

U.S. PATENT DOCUMENTS 6,494,437 B1 * 12/2002 Boyer .................... E02F 3/963
254/323
8,591,161 B1 * 11/2013 Bernhardt ............ G05D 1/0858
414/137.1
(Continued)

FOREIGN PATENT DOCUMENTS

| EP | 3984851 A1 | 4/2022 |
|---|---|---|
| WO | 2013052178 A2 | 4/2013 |
| WO | 2019041038 A1 | 3/2019 |

OTHER PUBLICATIONS

Aug. 18, 2020—(WO) International Search Report and Written Opinion—Appl. No. PCT/EP2020/064224, 14 pages.
Aug. 30, 2022—(GB) Examination Report—App. No. 2116641.8.

*Primary Examiner* — Medhat Badawi
*Assistant Examiner* — Vicente Rodriguez
(74) *Attorney, Agent, or Firm* — Banner & Witcoff, Ltd.

(57) ABSTRACT

A device includes hauling means for the movement of a payload while suspended from one or more lines. The or each line is suspended or suspendable from one end, the hauling means being provided at or in the region of the other end of the line/s and at which end the payload is situated in use.

19 Claims, 15 Drawing Sheets

(51) Int. Cl.
  *B64D 1/10*    (2006.01)
  *B64D 1/22*    (2006.01)
  *B66D 1/60*    (2006.01)
  *B64U 10/10*    (2023.01)
  *B64U 10/13*    (2023.01)
  *B64U 30/20*    (2023.01)
  *B64U 50/19*    (2023.01)
  *B64U 101/60*    (2023.01)

(52) U.S. Cl.
  CPC ............... *B66D 1/60* (2013.01); *B64U 10/10* (2023.01); *B64U 10/13* (2023.01); *B64U 30/20* (2023.01); *B64U 50/19* (2023.01); *B64U 2101/60* (2023.01); *B64U 2201/10* (2023.01)

(58) Field of Classification Search
  CPC .......... B64D 9/00; B64U 10/10; B64U 10/13; B64U 30/20; B64U 50/19; B64U 2101/60; B64U 2201/10
  See application file for complete search history.

(56)  References Cited

U.S. PATENT DOCUMENTS

| | | | |
|---|---|---|---|
| 9,422,139 B1* | 8/2016 | Bialkowski | B64D 1/22 |
| 9,676,481 B1* | 6/2017 | Buchmueller | B64D 1/02 |
| 9,849,981 B1 | 12/2017 | Burgess et al. | |
| 10,071,804 B1 | 9/2018 | Buchmueller et al. | |
| 11,142,316 B2* | 10/2021 | Sikora | B64C 39/024 |
| 11,407,511 B1* | 8/2022 | Buchmueller | B64D 47/08 |
| 2004/0032140 A1 | 2/2004 | Solstad | |
| 2017/0247109 A1 | 8/2017 | Buchmueller et al. | |
| 2018/0237276 A1 | 8/2018 | Bialkowski et al. | |
| 2018/0244391 A1 | 8/2018 | Curran et al. | |
| 2019/0100413 A1* | 4/2019 | Roedts, II | B66F 19/00 |

* cited by examiner

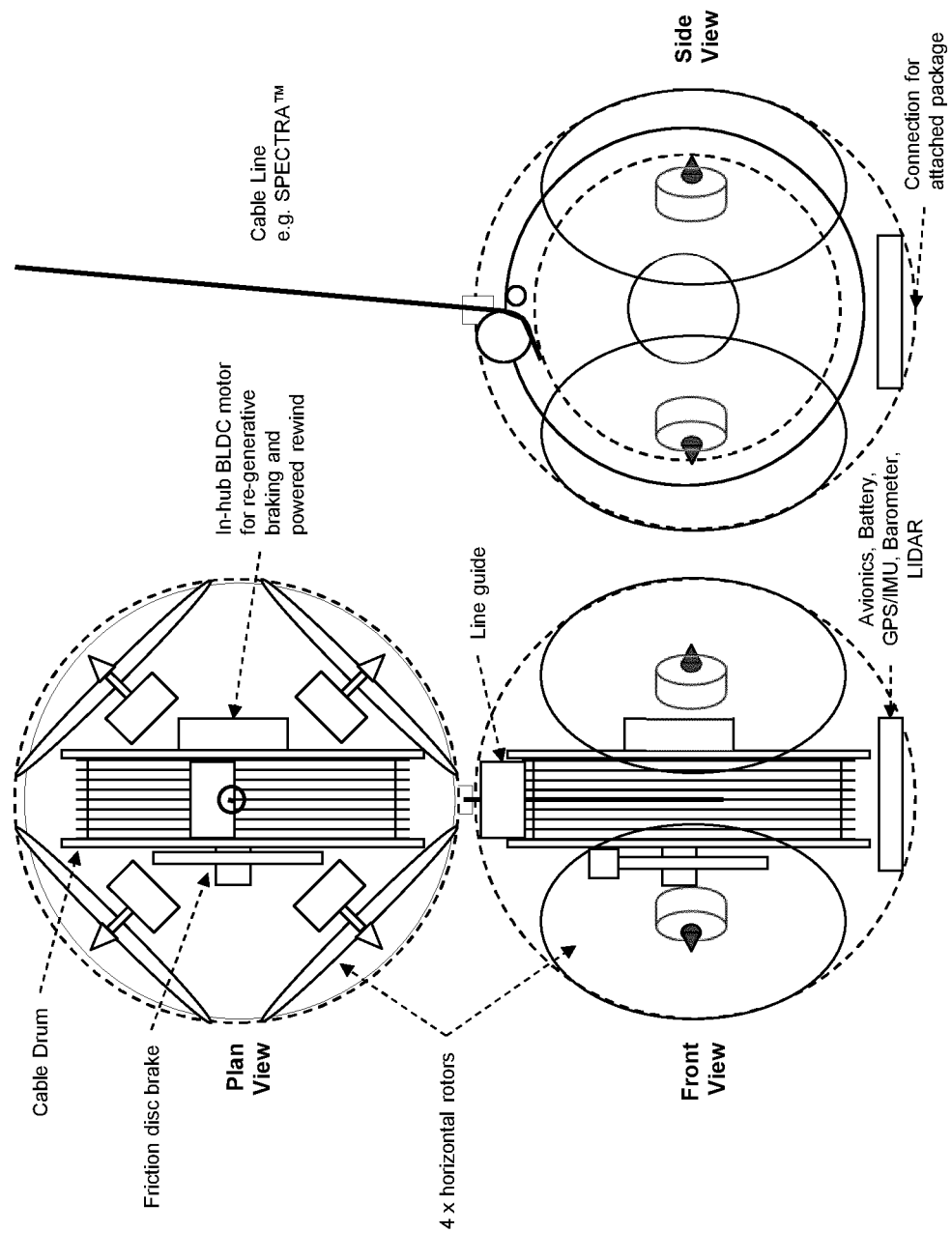
Figure 6

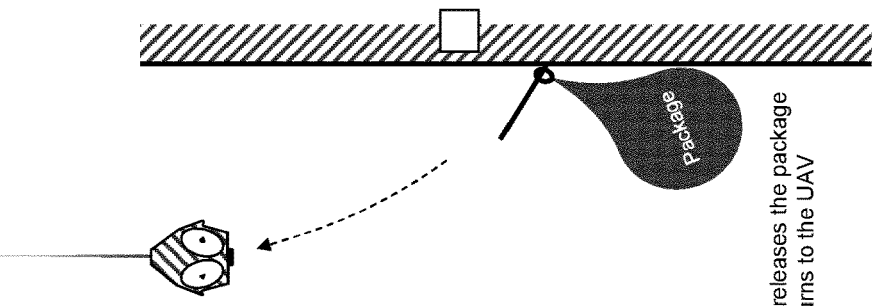
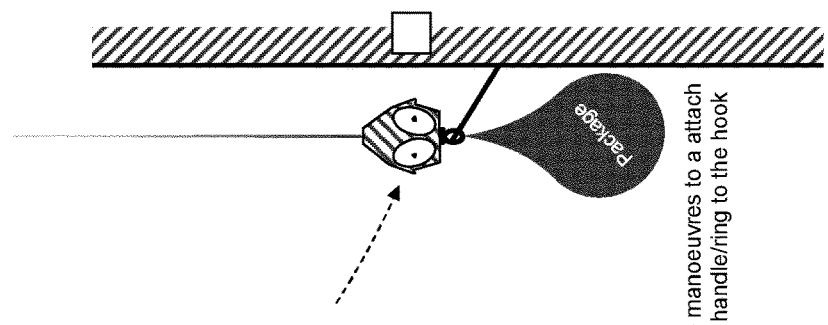
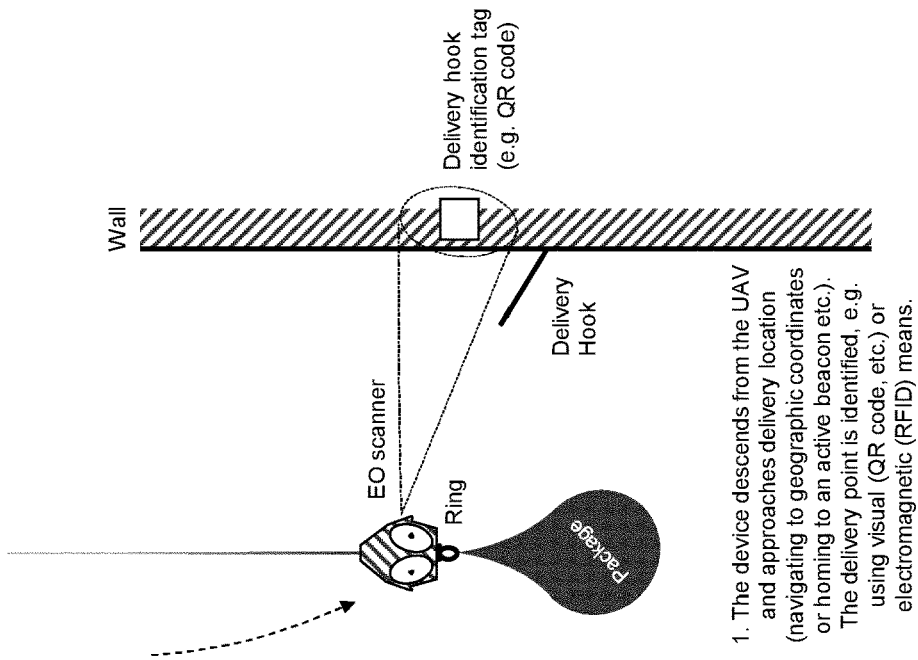
Figure 14

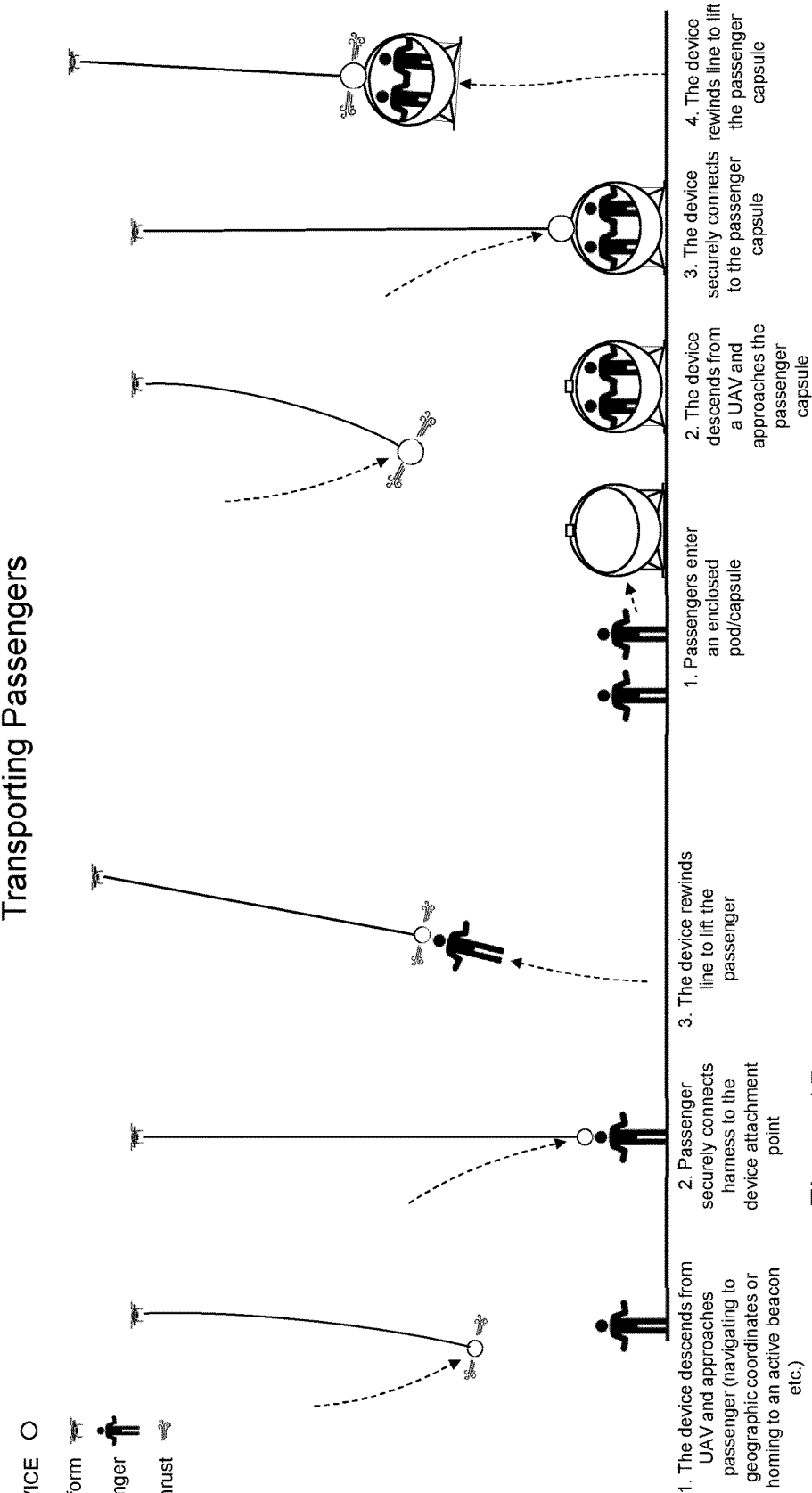

Functional Breakdown

System Diagram

TRANSPORT SYSTEM

CROSS-REFERENCE TO RELATED APPLICATIONS

This application is a U.S. National Stage application under 35 U.S.C. § 371 of International Application PCT/EP2020/064224 (published as WO 2020/234427 A1), filed May 21, 2020, which claims the benefit of priority to U.K. Application No. 1907302.2 filed May 23, 2019. Each of these prior applications is hereby incorporated by reference in its entirety.

The present invention relates generally to a transport system and particularly, although not exclusively, to systems, devices and methods for delivering and/or collecting and/or moving and/or holding payloads.

An airborne payload delivery system is known, for example, from US2018/0244391. Drone (for example unmanned air vehicle) delivery systems are known, for example, from US2017/0247109. In these systems a winch is provided on the vehicle and can lower a payload.

Current solutions to drone package delivery from an aerial (or air) platform include:
  Package delivery by unguided parachute—this method suffers from low accuracy and obstacles such as overhead cables and trees in urban or residential package delivery, and presents a high safety risk due to an inability to abort a delivery.
  Package delivery by landing the drone—this method generates a lot of noise, has a high visual impact, and increases the risk of collisions with nearby objects or people.
  Package delivery to specially designed locations, vehicles, structures and/or lockers—This method generates inconvenience for the customer to collect, or the requirement for an additional delivery method to take the package to the destination.
  Package delivery by unguided winch—This method requires the drone to hover at a low level, creating local noise, visual impact, public concern over invasion of privacy and increasing the risk of collisions with nearby objects such as wires, trees and buildings.

An aspect of the present invention provides a device including hauling means for the movement and/or holding in position of a payload while suspended from one or more lines, the line/s being suspended or suspendable from one end, the hauling means being provided at or in the region of the other end of the line/s and at which end the payload is situated in use.

A hauling/lifting/lowering means may comprise a winch provided on-board the device at or towards a bottom, payload end of the line. The winch may be a hauling or lifting device comprising a rope, wire, chain, cable, line or the like winding round a rotating cylinder/tube/spool/drum, turned typically by a crank or by a motor; an electric, hydraulic, pneumatic or internal combustion drive. Other embodiments use a spinner, reel, stationary drum or the like to cause the device to move towards/away from the end of the line opposite the payload end.

In some embodiments a winch having a cable/line length of, for example, up to 400 ft, up to 1000 ft, or 2-3000 feet or more above ground level may be used.

The winch may pay out from the payload end (rather than the drone end).

The winch may be associated with or provided on, by or in the region of a payload/package.

The winch system may include a kinetic energy recovery system operable, for example, as the winch slows down.

The hauling means may control the vertical movement of the device up and down the line or holding vertical position.

A further aspect provides a transport system for delivering and/or collecting and/or moving a payload, the system comprising a device, the device comprising a hauling means for letting out or pulling in a line, the line is suspended or suspendable at one end, in which the hauling means is provided at or in the region of the other end of the line.

Some embodiments, for example, relate to collection and/or delivery of payloads. In other embodiments payloads are moved (not necessarily for collection or delivery) which would allow controlled movement of payloads to a desired location (for example to allow sensing of a location or object).

A further aspect provides a device for the movement of a payload while suspended from a line, the line being attached or attachable to a platform at or towards a top, platform end and attached or attachable to a hauler on-board the device at or towards a bottom, payload end of the line.

The platform may comprise aircraft (manned or unmanned); alternatively or additionally some aspects and embodiments of the present invention encompass platforms mounted on the ground.

The platform may, for example, be an aerial platform.

The term "aerial platform" may refer to ground based platforms that extend into the air, such as cranes or working platforms.

The platform may, for example, be an air platform, for example a manned or unmanned aircraft.

A further aspect provides a device for the movement of a payload while suspended from a line, the line being attached or attachable to an aerial platform at or towards a top, platform end and attached or attachable to a hauler on-board the device at or towards a bottom, payload end of the line.

A further aspect provides a payload delivery or collection system comprising hauling device such as a winch device for pulling in or letting out a line, in which the winch is associated with or provided on, by or in the region of a payload.

In some aspects and embodiments the present invention may relate generally to an unmanned aerial platform to ground delivery system, for example a drone-to-ground delivery system.

The present invention may provide an autonomous system to deliver items.

Some aspects and embodiments relate to an aerial package delivery and collection device.

Some aspects and embodiments relate to an autonomous package delivery and collection device suspended from an aerial platform.

Some embodiments provide a device suspended from third party generic aerial platform for the delivery and collection of packages is provided. The separate aerial platform system (such as an unmanned air vehicle "drone", helicopter etc,) can be used to provide transportation between dispersed locations.

The line/s may, for example, be suspended or suspendable from a structure, ground-based structure, a floating structure, a structural member or a fixed structure. In one embodiment, for example, a line is suspended from a building ceiling. In another embodiment the device forms part of a crane-line structure or an overhead gantry (fixed or movable).

The line may, for example, be suspended or suspendable from an aerial platform.

The aerial platform may be unmanned, for example an unmanned aerial vehicle (UAV).

The aerial platform may be manned, for example a fixed wing aircraft, or a rotary wing vehicle such as a helicopter or gyrocopter.

In some embodiments the payload is either fixed directly to or underslung beneath the device.

In some embodiments the device is positioned beneath the payload.

The line may be made up of multiple threads, either intertwined or running substantially parallel or near-parallel.

In some embodiments the line material may be critical to the feasibility of the device.

Among other qualities, the material may have one or more of: high tensile strength, non-stretch, light weight, abrasion resistant, and be unreactive to UV radiation.

Widely available examples of suitable fibres include Spectra™ and Kevlar®.

Other examples of future line material include a suitable form of multi-walled carbon nanotubes cable. The payload may be a package, for example retail goods, food, medical and industrial goods.

In some embodiments the payload is a person.

In some embodiments the payload is a container. The container may, for example, be detachable from the device so it could be delivered. In other embodiments the container remains attached to the device and its contents are deployed; the container then returns with the device (it may be detachable to allow for replacement/maintenance). For this purpose the container may, for example, include a door, hatch, flaps, hinged section or the like to allow the container to open and deploy contents (or have them removed). For containers that stay with the device, sensors such as ground proximity sensors, could be provided at the bottom; for containers that detach sensors could be provided at the top.

The device may have on-board sensors, including: acoustic, vibration, chemical, electric current, electric potential, magnetic, radio, air flow, environment, weather, terrain recognition, moisture, humidity, navigation instruments, position, angle, displacement, distance, speed, acceleration, optical, light, imaging, photon, pressure, level, thermal, heat, temperature, proximity, ground proximity, presence, speed sensor, visual, audio, range finder.

The device may have local computing means, for example to receive, process and analyse on-device sensor signals; host control algorithms and generate demand signals for device actuators to demand lateral/vertical motion as required.

Local computing may receive drop co-ordinates from the aerial platform from a wired/wireless connection with the aerial platform.

Local computing means, where provided, may be redundant in nature and embody other safety critical monitoring and fail-safe features.

The device may be provided with on-board navigation means.

The device may be provided with a ground range finder.

The device may be provided with onboard power.

The device may be provided with communications means.

The device may comprise mobility means.

The mobility means may comprise one or more lateral/horizontal actuators. This can provide 3D movement when combined with ascent/descent of the device.

The horizontal actuator may comprise one or more fans and/or vanes and/or rockets and/or jet engines. Vanes can, for example, provide sideways thrust using the upward (relative to the device) rush of air as a device descends from the aerial platform to the ground.

The device may have an attach and release mechanism allowing it to pick up, hold and drop a payload.

Some embodiments are provided with safety features, such as redundant systems e.g. multiple brakes or multiple lines.

The present invention also provides an autonomous package delivery and collection device suspended from an aerial platform comprising a device or system as described herein.

The present invention also provides a drone-to-ground delivery system comprising a device or system as described herein.

Lateral control means may be provided, for example by using one or more rotors.

The payload/package may be attached or attachable under the device.

Descent control may, for example, be provided in the form of: servo control of a disc brake; friction brake, magnetic eddy current braking; regenerative braking. Braking can be used to maintain tension in a line. A motor and/or gearbox could alternatively or additionally be used to keep tension in a line.

Vertical control may, for example, be provided by a motor. Inertial damping may be used.

A height sensor in the form of LIDAR, RADAR, electro-optical, or ultra-sonic systems may be provided.

The cable may be provided on a single reel.

A cable store may be provided.

A line guide may be provided.

Orientation rigidity may be provided using gyro-stabilisation (spinning reel). An orientation sensor may be provided. Additional control may be provided by vanes, swivelling rotors, or inclined rotors using counter-torque (as used to steer quadcopter drones).

One or more inertial sensors may be provided. An Inertial Measurement Unit (IMU), for example, is a self-contained system that measures linear and angular motion, usually with a triad of gyroscopes and triad of accelerometers.

Navigation may be provided by independent Global Satellite Navigation System (GNSS) receiver and/or an IMU. Positional data may be provided by the supporting platform to the device via a data connection (physical or wireless) prior to separation. Positional data may be absolute (latitude and longitude for example) or relative to the destination.

Drop height examples: up to around 50 ft, 100 ft, 400 ft, 1000 ft, 2000 ft, 3000 ft, 4000 ft, 5000 ft and above.

Logistics

A device body and package could be shaped to avoid snagging on branches for resupply in areas enclosed by trees.

Multiple Packages

Some embodiments provide the ability to re-load the device with the next package for delivery when in proximity with the aerial platform at height.

Sequentially at different locations (multiple packages, one at a time from a single device)—refer to FIG. 9.

Some embodiments may be provided with a suitable payload/package release mechanism.

Simultaneously by using multiple devices from the same aerial platform.—refer to FIG. 9.

Organic sensors may be integral to the device body or as a 'pod' attached for specific tasks.

The device may offer controlled, inertial stabilised 3D positioning.

Some embodiments have the ability to provide close range, high detail Electro-Optical imagery and audio of a specified object, moving vehicle or stationary location.

Some embodiments allow for the pickup of packages/sensors mechanism in addition to drop off.

In some aspects and embodiments the device is combined with a second winch mechanism fixed to an aerial platform at the top end of the cable with a large spool for gross vertical positioning (i.e. the majority of the decent) before the device hauling mechanism takes over when more precise positioning and feedback from local sensors are required, for example when close to nearby surface objects.

Some embodiments comprise means for providing vertical control/stability, for example a feedback loop. This may be achieved, for example, using motor control based on the output of an accelerometer.

Some embodiments have the ability to approach locations on vertical surfaces (e.g. specific windows on a building).

In some embodiments the device can place packages on a wall-mounted hook, or other receiving mechanism which may be lockable or latchable, next to or under a customer's door or window. This is a potential solution to home deliveries, especially to flats without any outside space. The hook could, for example, require an associated identification tag such as a QR code.

Integrated sensors and image analysis may be used for autonomy/intelligence—reacting to local surroundings.

Some embodiments provide for a drop to be aborted if there is unexpected activity/movement at the impact point representing an unacceptable safety risk.

Some aspects and embodiments provide for packages/sensors to be passed from one aerial platform to another in-flight, extending delivery range or sensor endurance. This may require an additional device attached to the device and/or payload.

Some embodiments use efficient fixed wing aerial platforms with no requirement to hover during pick up or drop off. This requires the aerial platform to follow a flight path that keeps it within a horizontal distance of the target designation that is less than the scope of horizontal movement of the device allowing the device to remain vertically above a central location for the period of the delivery or pick up for example a U-turn, tic-tacking or continuous circling in the overhead (adjusted for wind).

For times and/or locations when there is reason to reduce noise to a minimum, the device allows the supporting aerial platform to be designed to glide for critical periods of the delivery or pick-up.

Applications

The term 'package' could include one or more people and/or animals. The device could, for example, provide a rapid means of transferring personnel in both directions between the surface and the supporting aerial platform. In some embodiments the or each person and/or the or each animal could be directly picked up by a device (for example using a hook or strapping; in other embodiments a "pod" or the like container which can be collected/delivered may be provided).

The device may provide a means of keeping passengers at a distance from noisy engines mounted on the aerial platform during transit allowing smooth, quiet transport. The device allows potentially large, noisy aerial platforms (air taxis etc.) to maintain a height well above the ground and clear of buildings while picking up and dropping off people (for example in passenger pods) in urban environments.

The device may allow delivery to windows, post boxes or other locations that require precise location within confined spaces or in close proximity to surrounding objects.

In some aspects and embodiments the present invention provides or relates to a system for delivering supplies (water/food, medical supplies, tools or equipment etc.) from logistics hubs to customers on foot, in vehicles, in open ground, under tree cover, under overhead cables or within buildings behind external doors and windows.

Some aspects and embodiments provide an ultra-long hauling mechanism allowing a UAS to widely separate the large, noisy, vulnerable flight components (e.g. motors, fuel, rotors and wings) from the much smaller payload components (package, sensors, etc.). This allows the flight components to be optimised for efficiency rather than manoeuvrability, and the much smaller agile payload to operate more quietly and precisely with lower impact on surrounding environment. This requires the payload 'end' to be manoeuvred by an autonomous unit with freedom horizontally and vertically.

The device may allow the supporting aerial platform to remain unseen and unheard. The device itself may be small and can more easily be ruggedized than an entire UAV.

The device may allow a drone to remain high enough not to be heard.

The device may allow the drone to stay at height instead of slowly navigating at low level. It is also feasible that efficient fixed wing drones will be able to circle overhead while the device/system delivers.

The device can allow the drone to remain well clear of ground obstacles while the device and package goes vertically down, and the device returns vertically up.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, by way of example, with reference to the accompanying drawings.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples.

There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In the embodiment of FIG. 1 the device is intended for the movement of packages while suspended from a single line attached to an aerial platform (at the top end of the line) attached to a hauling mechanism on-board the device (at the bottom end of the line). In this embodiment the cable is ~2000 ft of thin (<1 mm) strong (>1 00 kg) line.

In this embodiment a single line is made up of multiple threads either intertwined or running parallel for redundancy/safety.

A winch provided onboard the device provides a hauling mechanism which controls the vertical movement of the device up and down the line.

The device also has on-board sensors, processing, navigation, power, communications and horizontal actuators (fans and/or vanes) allowing fully autonomous mobility within a reachable area defined by the height of the aerial platform and length of line and thrust provided by the horizontal actuators. The device also has an attach and release mechanism allowing it to pick up, hold and drop packages.

FIG. 2 shows an embodiment with a separate sensor pack. The sensor pack is detachable. Different sensors packs can therefore be attached to a device.

FIG. 3 shows a further embodiment with a package attached under the device. A nose section is provided under the package and in this embodiment includes sensors such as a range finder.

An example drop/descent profile is shown in FIG. 4.

In one example an unmanned aerial platform loaded with a 10 kg package from a logistics store flies at an altitude above potential interference from the ground and within the local regulations provided for unmanned aerial platforms (potentially 400 ft above ground level). When approximately above the destination, the device descends from the aerial platform at speed on its own on-board winch, unreeling a strong, thin multi-filament non-stretch braided line (I mm diameter offers >100 kg braking strain). The device navigates towards the destination coordinates using GNSS or inertial sensors (etc.) and manoeuvring using active thrust and/or fins in the vertical airflow. A height sensor (LIDAR, etc.) measures the height above ground level. At the appropriate height, a brake (physical, electromagnetic, aerodynamic etc.) gradually slows the device maintaining a smooth deceleration profile until just above or impacting the ground at a safe speed (e.g. ~1 m/s). The package is released and the on-board winch rewinds device back up the line to the aerial platform.

Some embodiments provide for generally constant G-force deceleration. For example a processor could look at remaining height and speed and then calculate how hard to brake with a generally constant force. Other embodiments may, for example provide for a slowly increasing or slowly decreasing profile.

The system may monitor and control a speed and height profile.

By providing the means for aerial platforms to drop from height, the device offers advantages over parachute drop, allowing a safe, low-signature (visual and acoustic) resupply to individuals at a precise location in a complex environment.

The systems and devices provided by the present invention can provide solutions with unique advantages to drone delivery applications, such as:

deliver packages vertically, while an efficient fixed-wing UAS remains in forward flight, circling in the overhead.

precise, safe delivery in close proximity to other objects and people—including to specific windows of a building.

deliver multiple packages from a single UAV, sequentially using the same device, and simultaneously using multiple devices.

Wind Offsetting—FIG. 5

To be feasible, devices may need cope with wind speeds of up to, for example, 15 m/s (~30 kts) at the surface or up to 30 m/s (~60 kts) at height.

The device may counter a constant wind by off-setting the position of the aerial platform upwind from the destination, so the wind takes the device and payload/package back towards the destination.

Some devices are provided with horizontal thrust capability, which can be used to help cope with wind variability whilst manoeuvring to the exact destination and away from ground obstacles.

Wind Variability

Example: 20 cm diameter propellers may produce—ION of thrust in any direction. Thrust will depend, for example on the propeller and motor combination. A turbofan of the same diameter may offer a lot greater thrust; a rocket even more so.

A rough example is that ION of thrust is sufficient to push a 12 kg (10 kg for package, 2 kg for the device) up to approximately 5 degrees in any direction.

Some embodiments may provide means for detecting telephone cables, power cables, trees or other potential obstructions for the device as it descends or ascends.

Advantages

The device allows the aerial platform the additional option to remain at height (up to 3000 ft above ground level) while picking up, moving and dropping off packages, without precluding the traditional options of landing or winching from a lower height (e.g. 10-100 ft).

Compared to a UAV landing or using a short unguided winch, the present invention offers the following advantages:

reduced acoustic and visual impact to observers on the ground reduced vulnerability of the aerial platform from ground-based obstacles (trees, urban wires) or intentions to cause damage increased safety of receiving personnel not being in close proximity to a large UAV increased range and efficiency of the aerial platform increased tempo of delivery FIGS. 6 and 7 show further embodiments.

System description The embodiments of FIGS. 6 and 7 comprise one or more of the following onboard components:

A winch (to control vertical movement), comprising a cable (one end remains attached to the aerial platform, one end is coiled around the onboard winch cable drum).

Examples of the cable material may be an ultra-high molecular weight polyethylene (UHMWPE) such as Honeywell Spectra, or Kevlar based.

The cable material is selected for high strength, low weight, low stretch, resistant to abrasion and radiation, low absorption of water, A cable drum and (onto which the cable is wound using a cable guide).

A motor and gearing system (if required) possibly connected to a drum.

A braking system—either physical (disc brake etc), electromagnetic (generative braking, magnetic eddy current braking etc) or aerodynamic drag.

A multi-directional propulsion system (to control horizontal movement), comprising one or both of the following:

A system of propellers and motors. These could be arranged in the following ways 2 or more propellers fixed within the device pointing to provide thrust in fixed directions 1 or more propellers with the ability to swivel to provide thrust different directions 1 or more propellers providing thrust that is directed through vents to direct thrust in different directions A system of steerable vanes that use the airflow past the device during a fast descent to provide directional thrust—see FIG. 8, for example.

An optional system to control orientation may be provided. A turning force could be generated in the following ways:

A propeller providing an off-centre thrust

Vanes positioned within airflow: either airflow past the device during a fast descent Airflow generated by a propeller (either a dedicated propeller or the propeller system used for horizontal movement)

A generic package connection and release mechanism may be provided.

Avionics may be provided.

A power source may be provided, such as one or more batteries, or other forms of providing power.

A charging mechanism may be provided, comprising one or both of the following to external means (connecting to the aerial platform, or other system)

Re-generative braking.

One or more sensors may be provided, such as:

LIDAR/Laser Range Finder—to provide height above ground level

SONAR—to provide distances to nearby surfaces

Optical—to provide imagery of destination and nearby objects. This could include, for example, using 2 or more optical sensors to generate a 3D model of surroundings using photogrammetry methods.

Orientation control may not be provided/required in some embodiments.

In some embodiments a winch drum is relatively large, which can be used to provide inherent gyroscopic stability as it spins.

A navigation system may be provided, providing either absolute or relative positioning in order to guide to the destination. This may include one or more of:

Global Navigation Satellite System

Inertial Navigation System

Compass

Reference e.g. terrain referencing (i.e. comparing sensed surroundings with what is expected from a terrain database).

Processing capability may be provided, for example relating to navigation, safety or decent profile.

A communications system may be provided.

The package may be either fixed directly to, or underslung, beneath the device.

A container could stay with the device and be used to transport loose articles (requiring an opening/closing mechanism) and re-filled multiple times. This could include the use of a net or bag. The container could be connected/disconnected as a whole, requiring a new container to be attached.

Sensors e.g. electro-optical, audio.

Some embodiments are adapted to transport people/animals, for example within open or closed passenger 'pods'/seating which may be strapped directly under the device. Such embodiments may have control means provided at the payload end, which could, for example, allow a passenger to exert at least some control over height and/or lateral movement and/or orientation of a pod. This could be for commercial and/or leisure purposes. The device can be an active participant in the control of its height/lateral position/orientation.

Potential for passenger to control horizontal or vertical actuators of the device.

Aerial platform

Manned or unmanned

Any type with ability to hover or 'ability to fly slowly (up to ~60 kts)

Paramotor

Fixed wing

Single/multi-rotorcraft—e.g. manned helicopter, tri-copter, quadcopter, octocopter etc.

Hybrid VTOL

Generic Process

Offsetting for wind

Rapid descent using constant G deceleration profile

Approaching windows of buildings

Ability to Descending through obstacles such as tree canopy, urban wires

Devices may be able to receive and deliver to coordinates and/or home in on a beacon (active or passive).

Devices may be able to deliver to stationary positions (e.g. a ground location, building window, person such as a person holding a mobile telecommunications device or locker) and/or moving positions (e.g. a vehicle such as a land or marine craft).

Multiple packages—FIG. 9.

Reloading a device at the UAV with one or more packages per descent.

Single device loaded with multiple packages allowing sequential deliveries to same/nearby ground locations before returning to aerial platform. Packages may be released one at a time.

Multiple devices suspended under single aerial platform allowing multiple packages to be delivered simultaneously and same/nearby locations.

Braking could, for example, be applied by physical, electromagnetic (both magnetic eddy current or through regenerative mechanism using the motor) or aerodynamic or other means.

Power generated as a device descends could be used to help retrieve the device e.g. by charging a batter, capacitor or supercapacitor.

Figure 3:
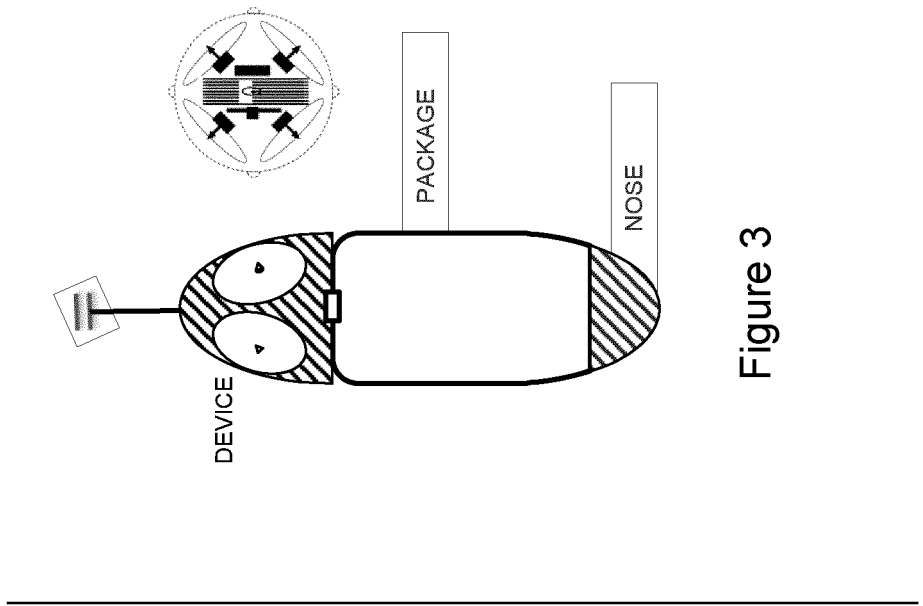
Figure 2:
Figure 1:
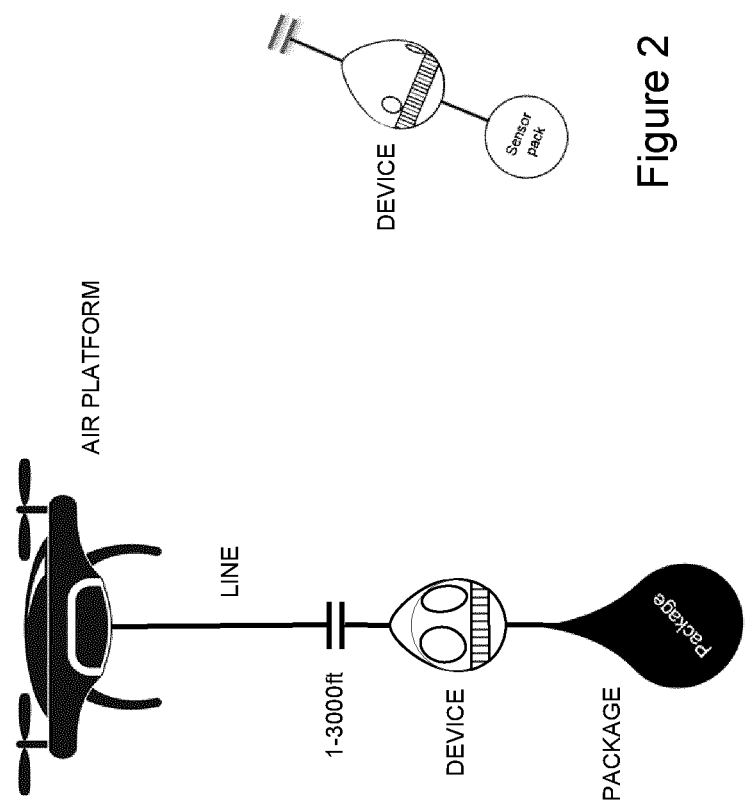
Figure 4:
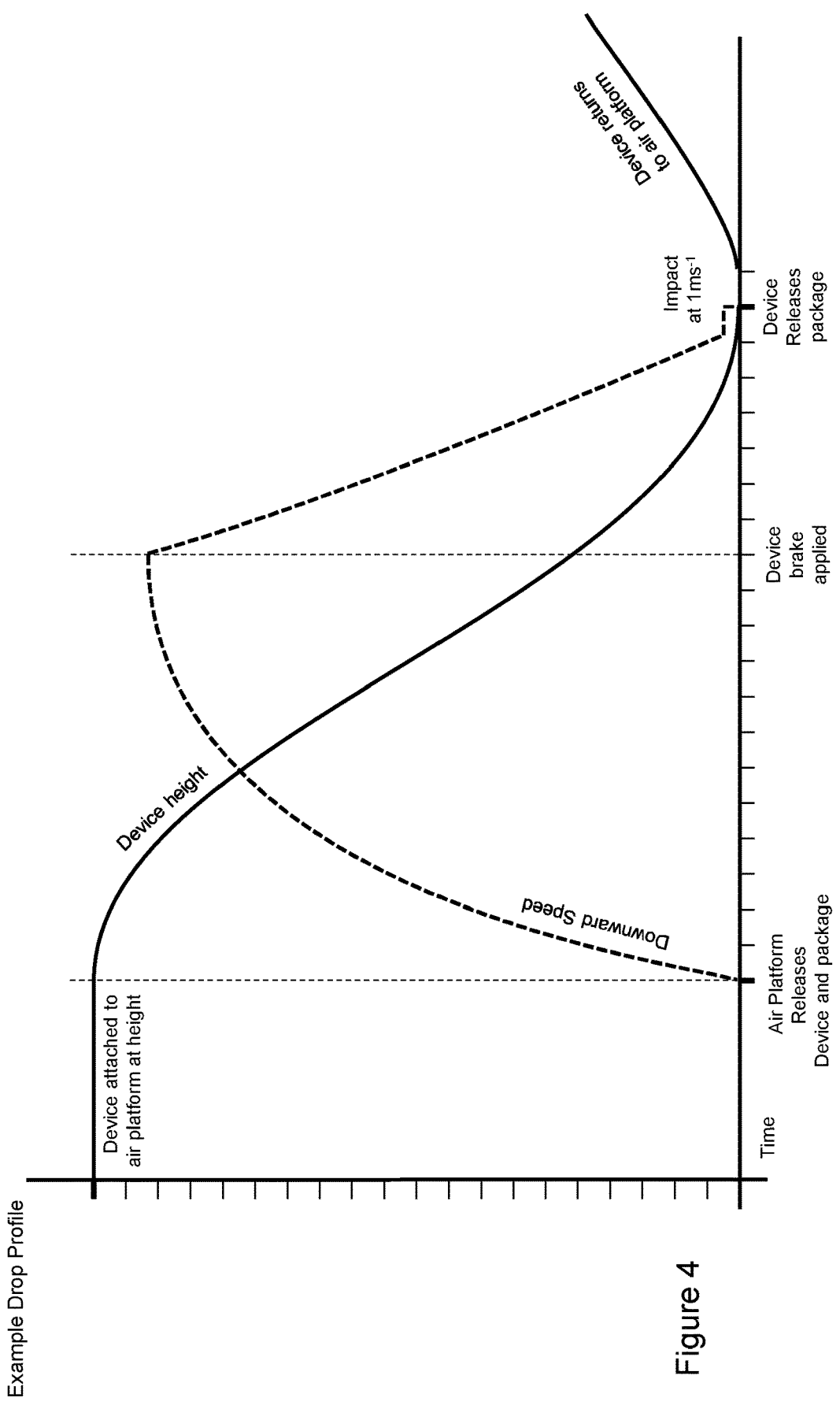
Figure 5:
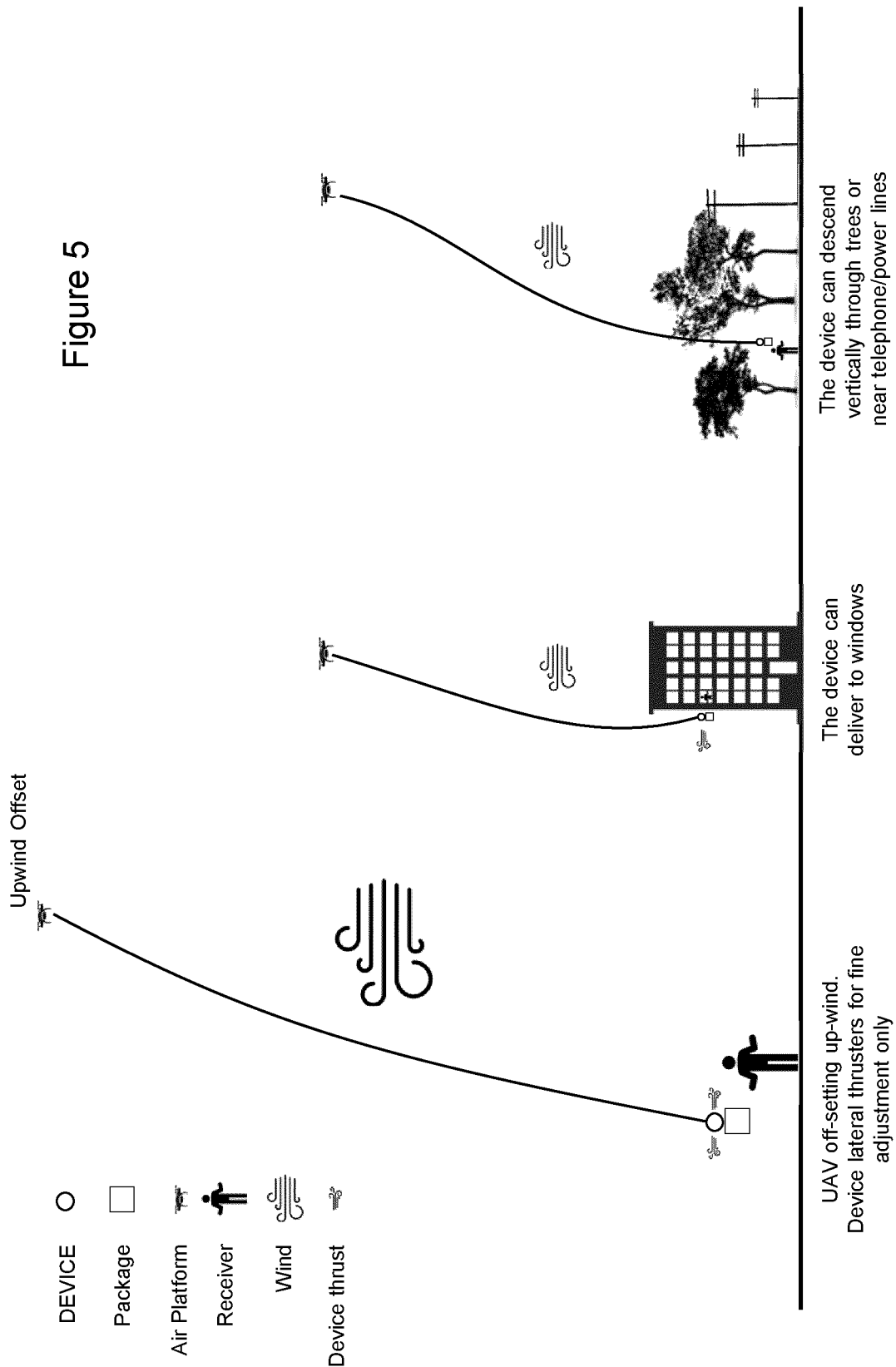
Figure 7:
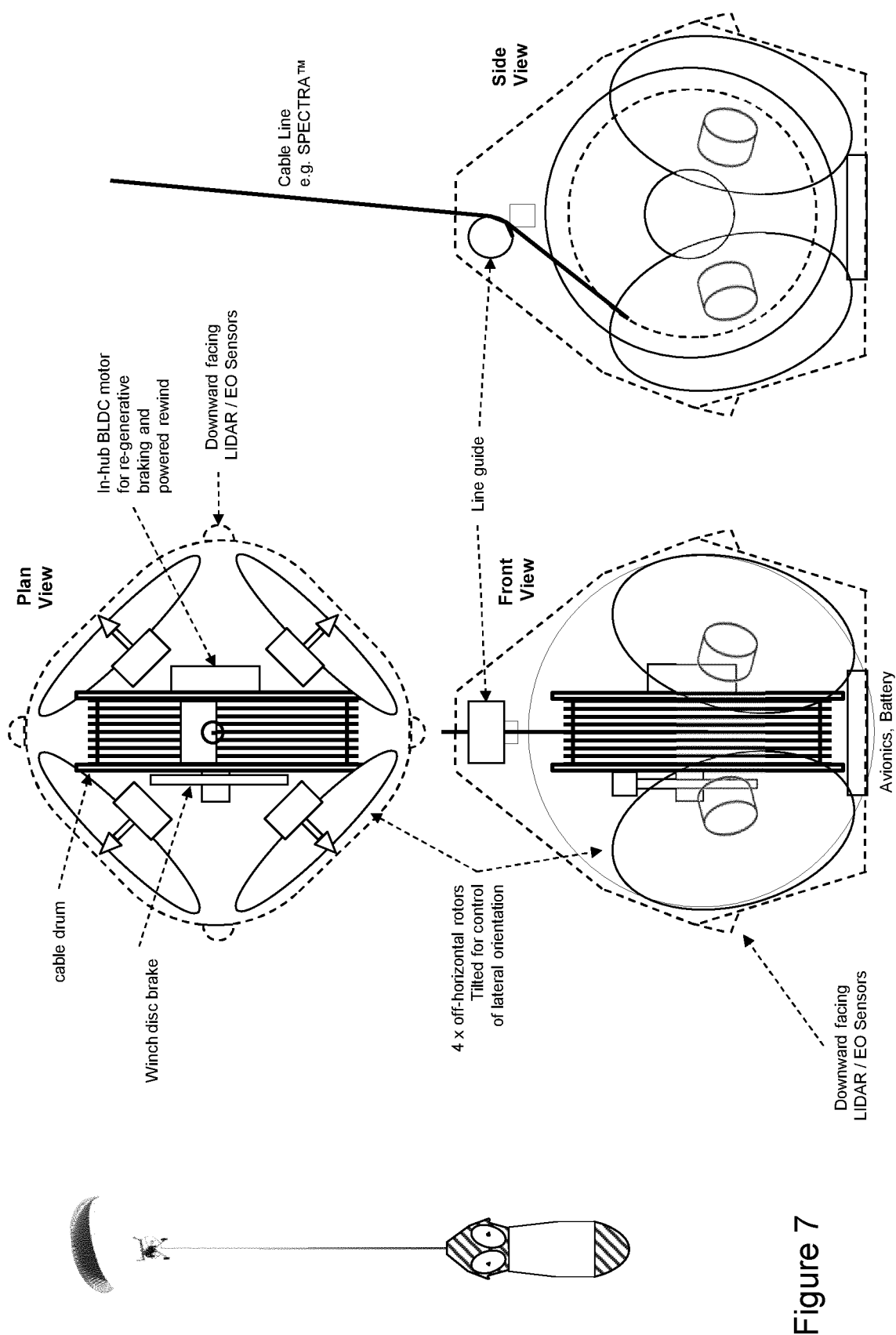
Figure 8:
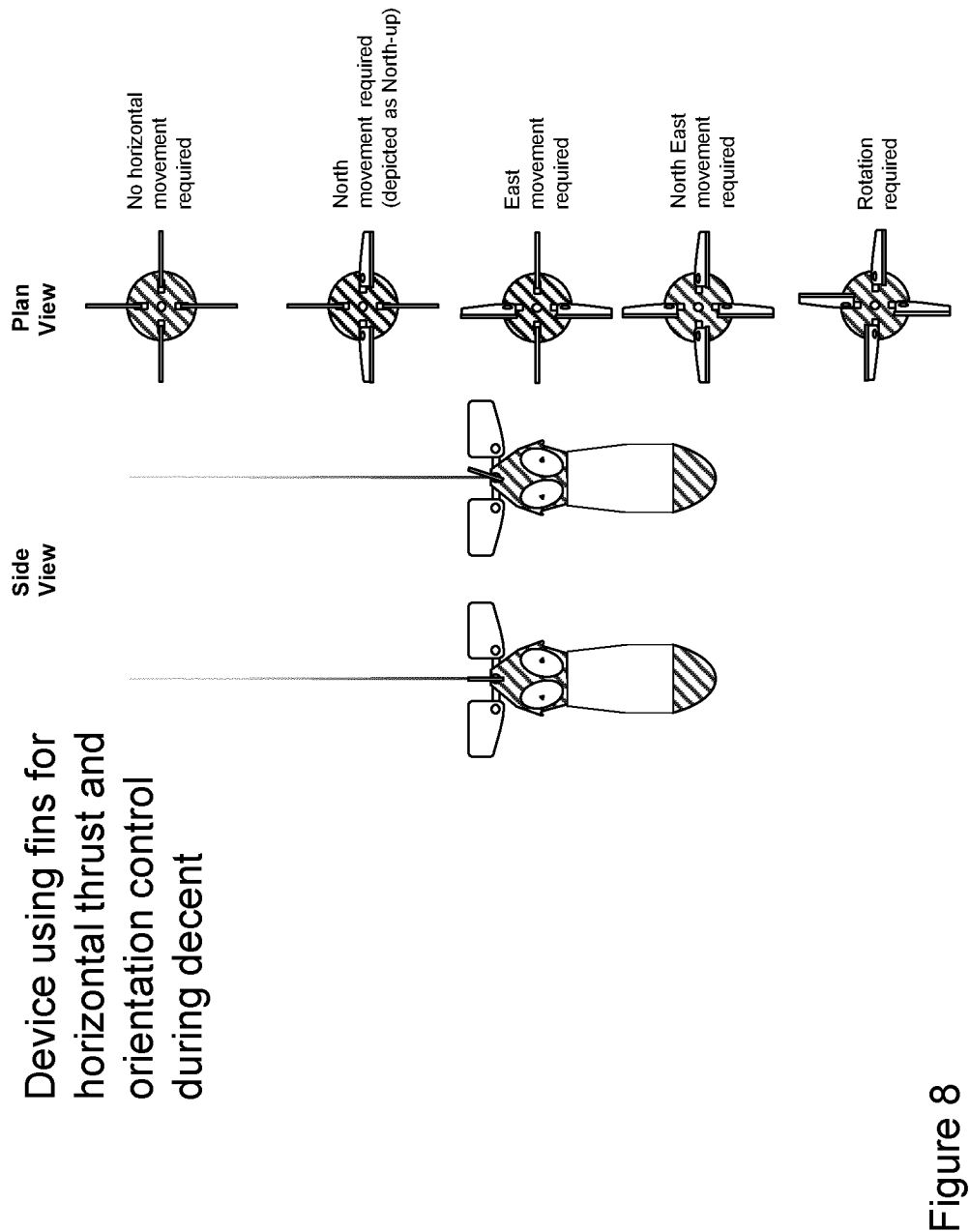
Figure 9:
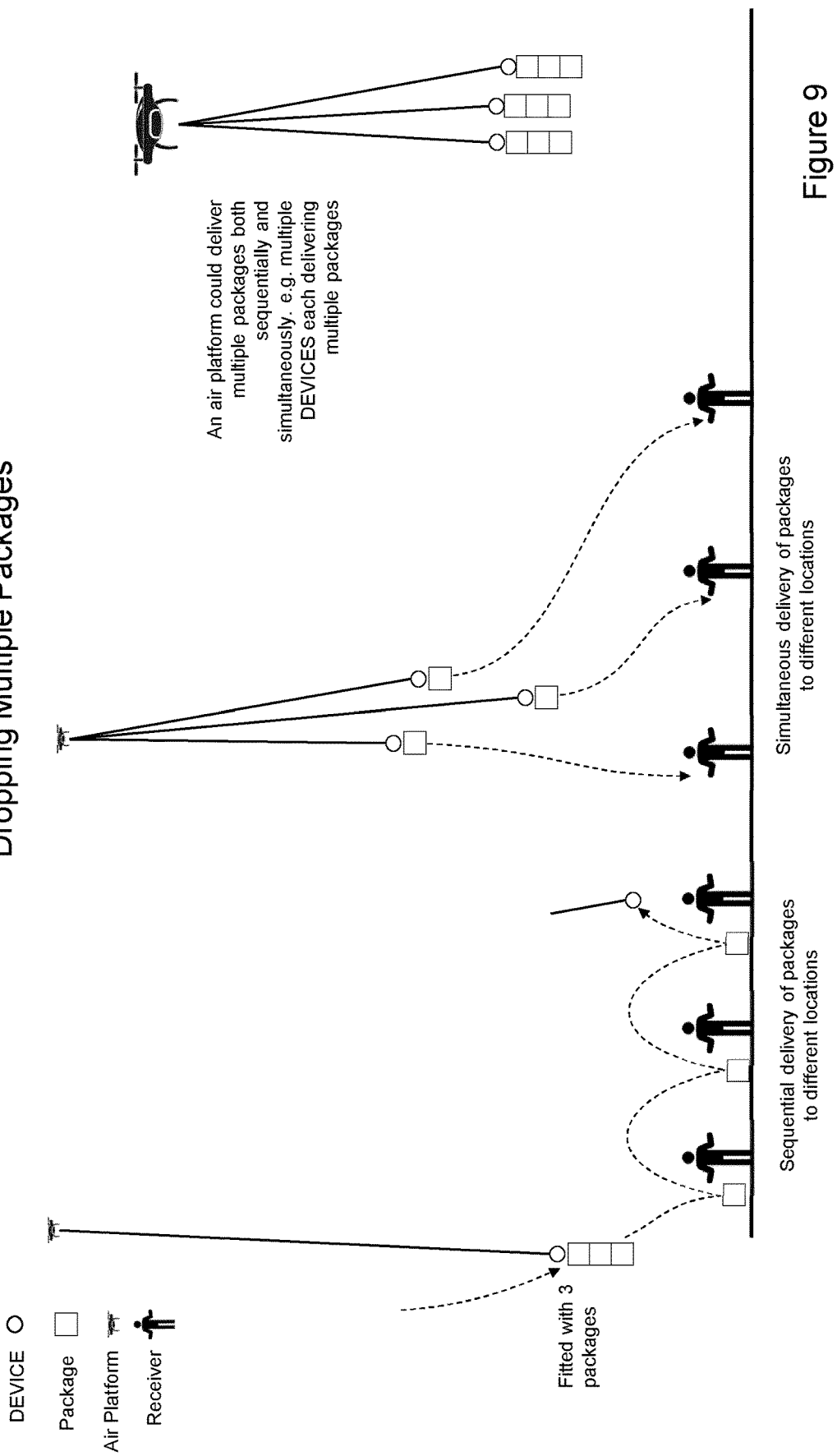
FIG. 9 shows sequential and simultaneous drop/delivery.
Figure 10:
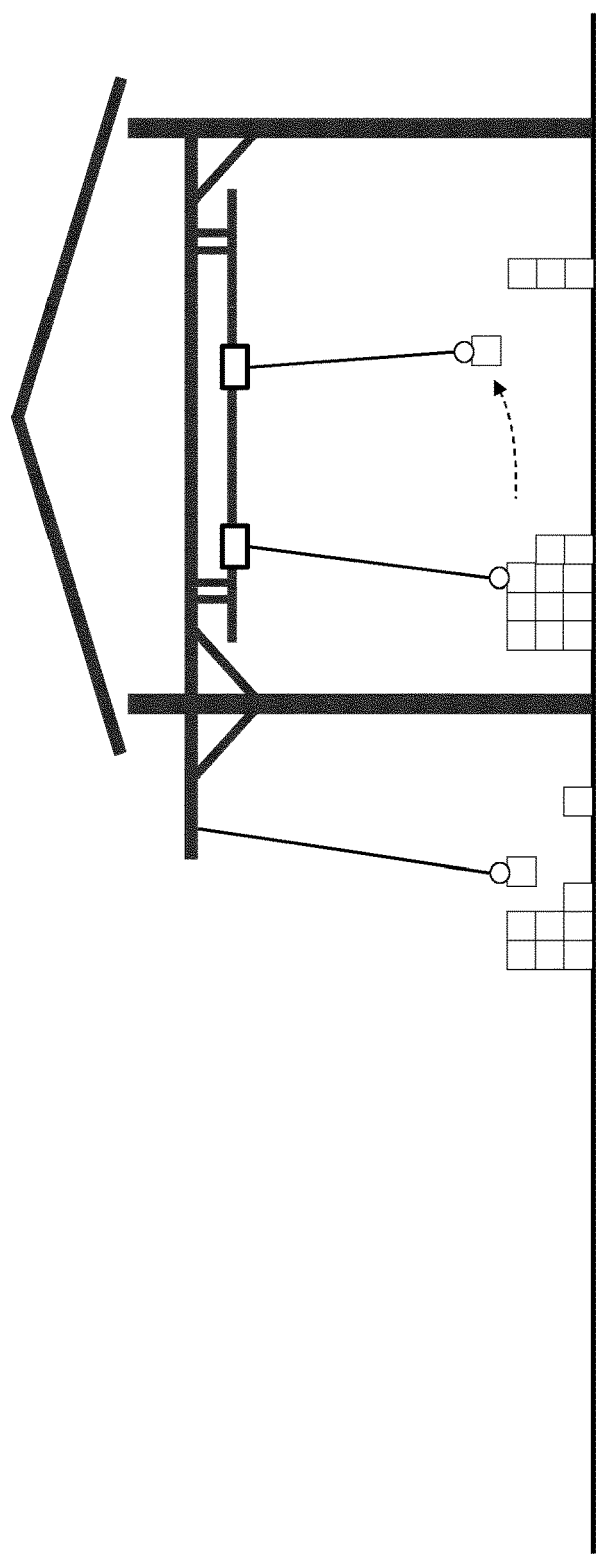
FIG. 10 shows an embodiment with a line suspended from a building ceiling such as a warehouse.
Figure 11:
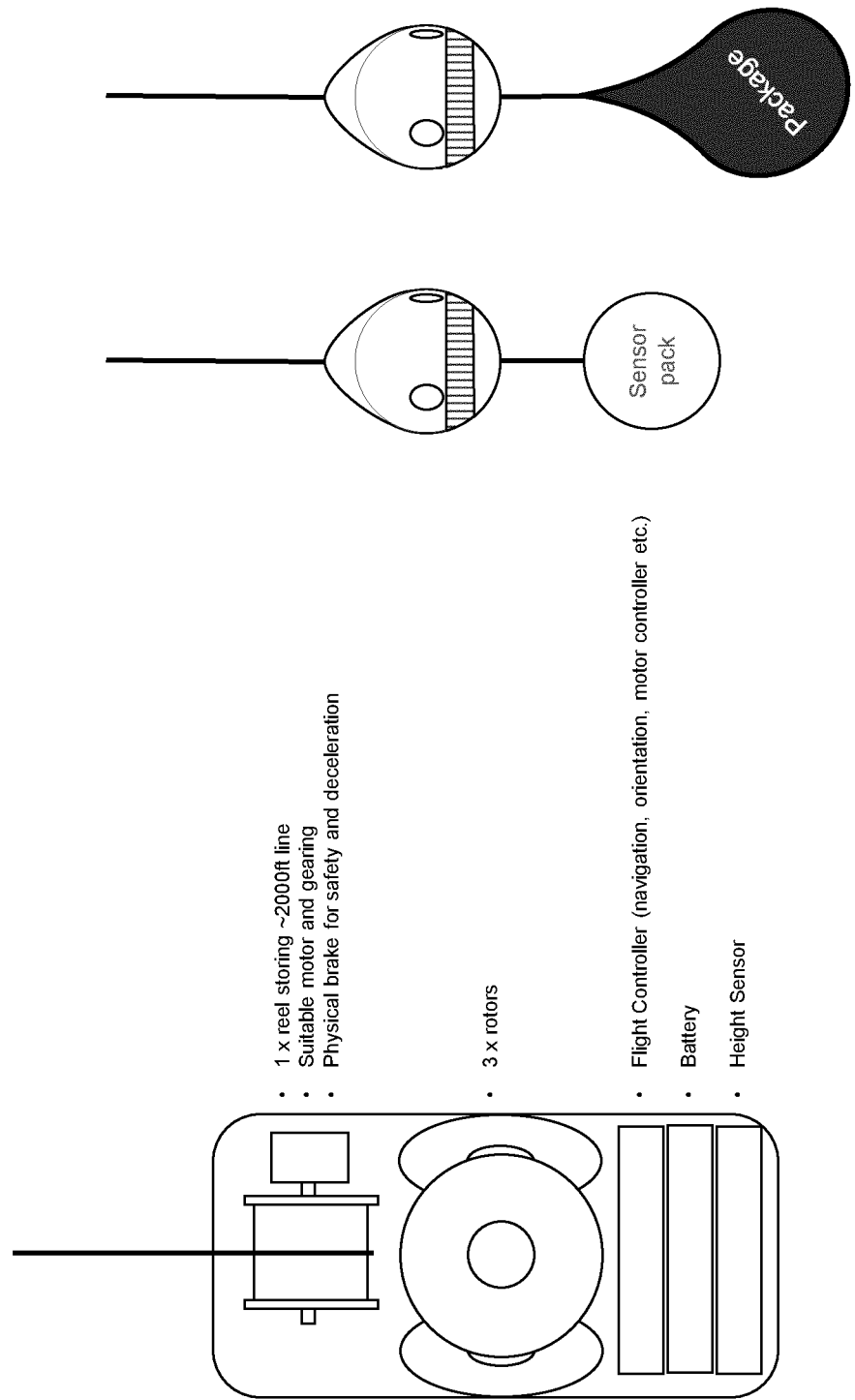
FIG. 11 shows a device formed according to a further embodiment. In a further embodiment a battery could be charged as the device descends.
Figure 12:
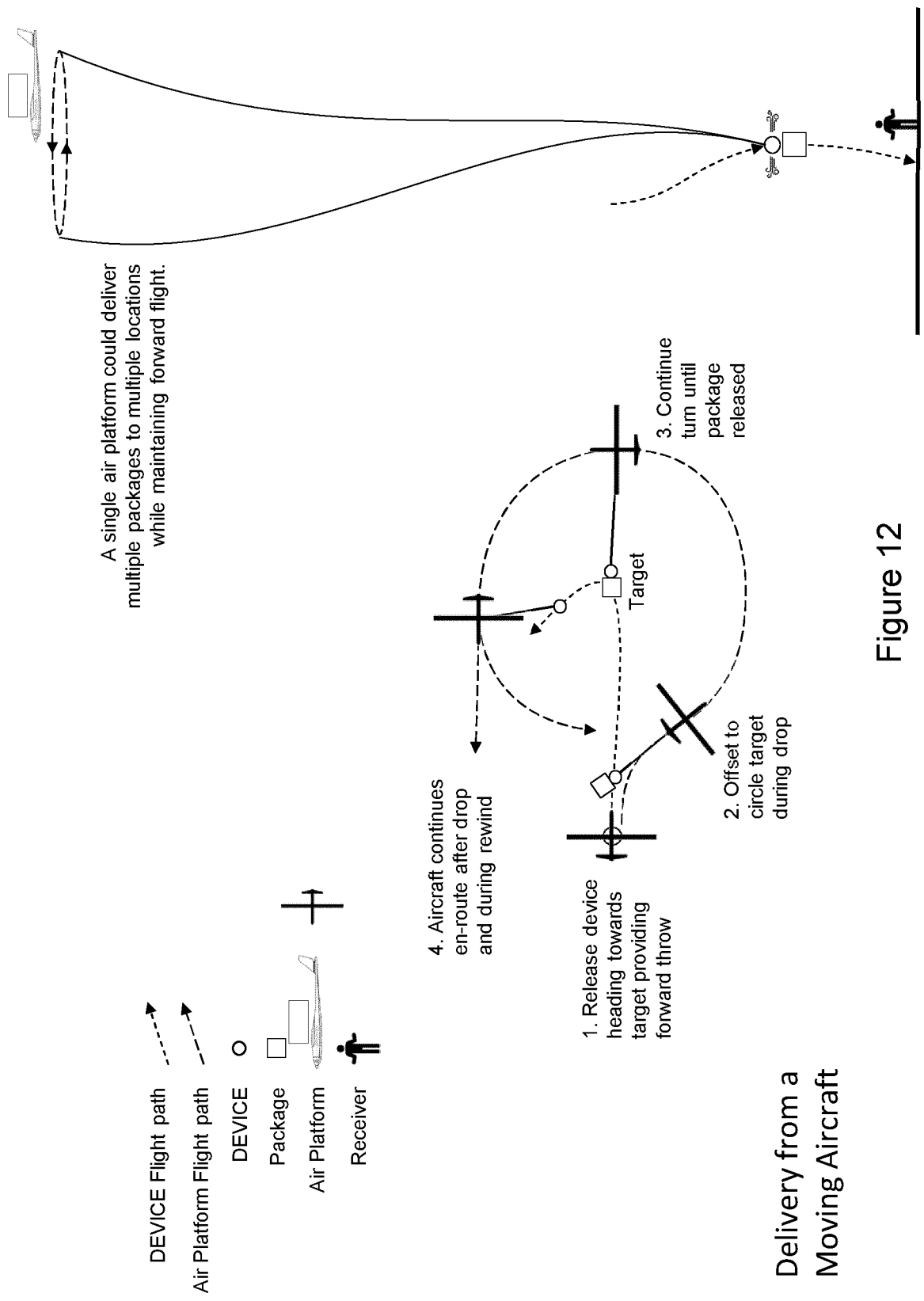

FIG. 12 shows a system for dropping from a moving fixed-wing aerial platform. The aerial platform could, for example be a motor-glider, paraglider or hang glider.

Figure 13:
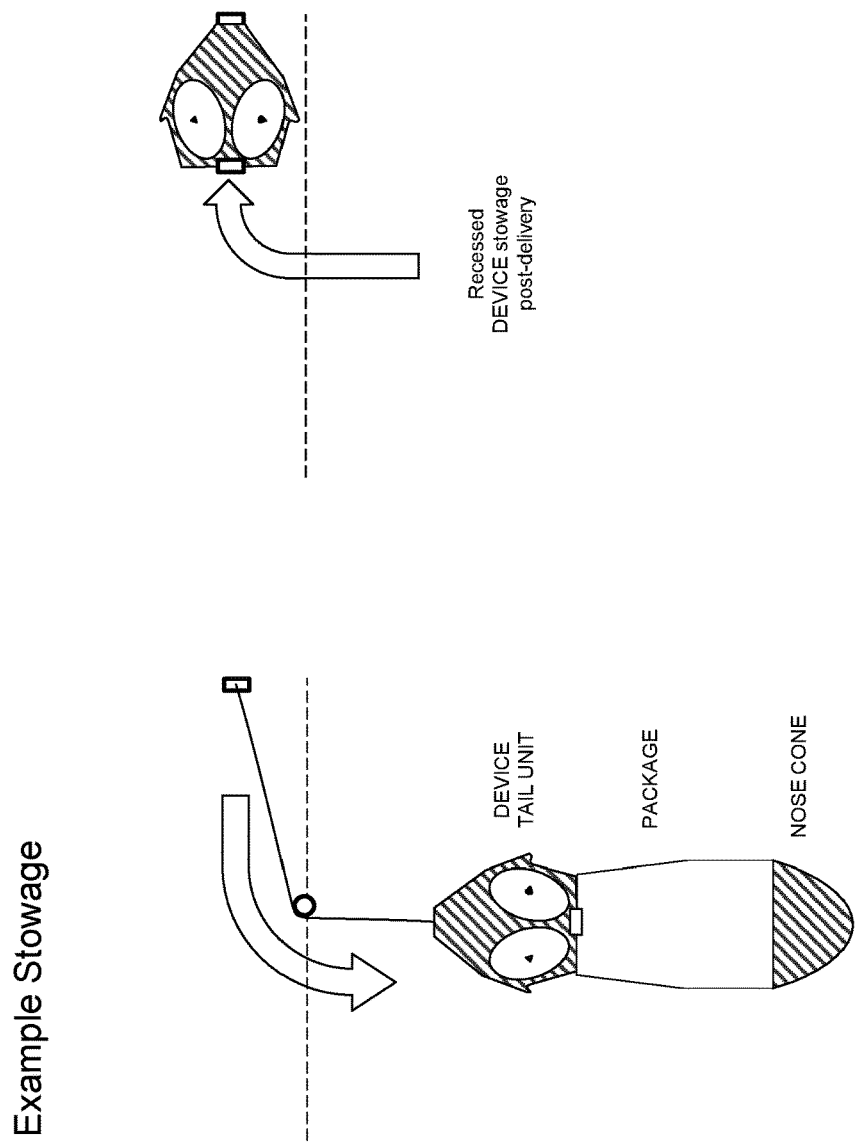

FIG. 13 shows an example of a stowage system provided in some embodiments. Some embodiments have a container with a hinging nose cone or other means of allowing access to a container. The container is not delivered, but the contents thereof can be deployed/removed (which may be whole or could, for example, be in a further container/carrier such as a bag).

In FIG. 14 the device can place packages on a wall-mounted hook next to or under a customer's window. This is a potential solution to home deliveries, especially to flats without any outside space. The hook requires an associated identification tag such as a QR code.

In this embodiment the device is provided with an electro optical (EO) scanner. Other forms of sensor/tag could be used, such as radio frequency identification (RFID).

FIG. 15 shows a passenger transport system formed in accordance with the principles of the present invention. In this embodiment a UAV is used to collect a passenger via a harness. The harness may be provided by the device; alternatively the passenger may have a harness to which the device can connect.

FIG. 16 shows a passenger transport system formed in accordance with the principles of the present invention. In this embodiment a passenger pod is provided to which the device can connect.

Figure 17:
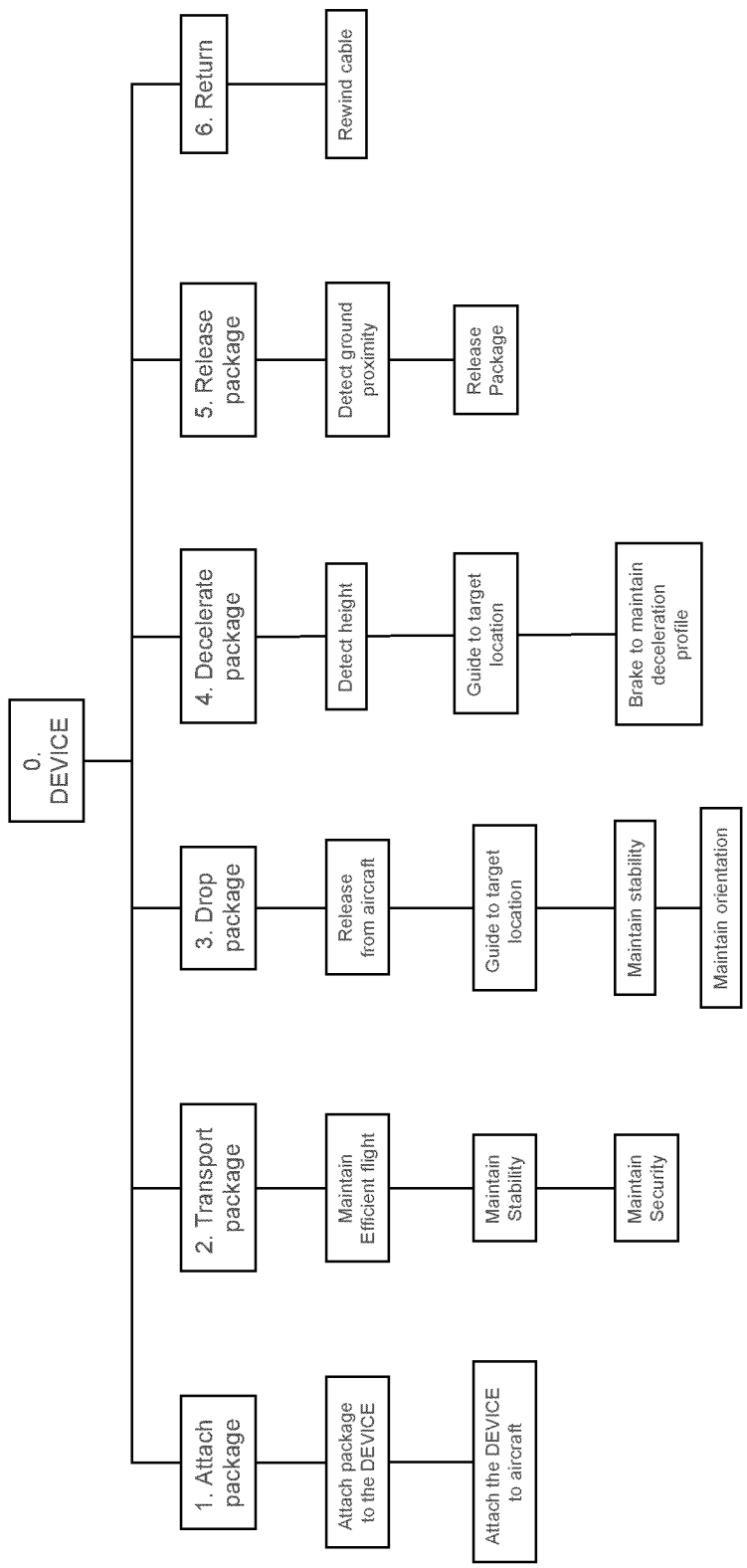

FIG. 17 shows an example functional breakdown.

Figure 18:
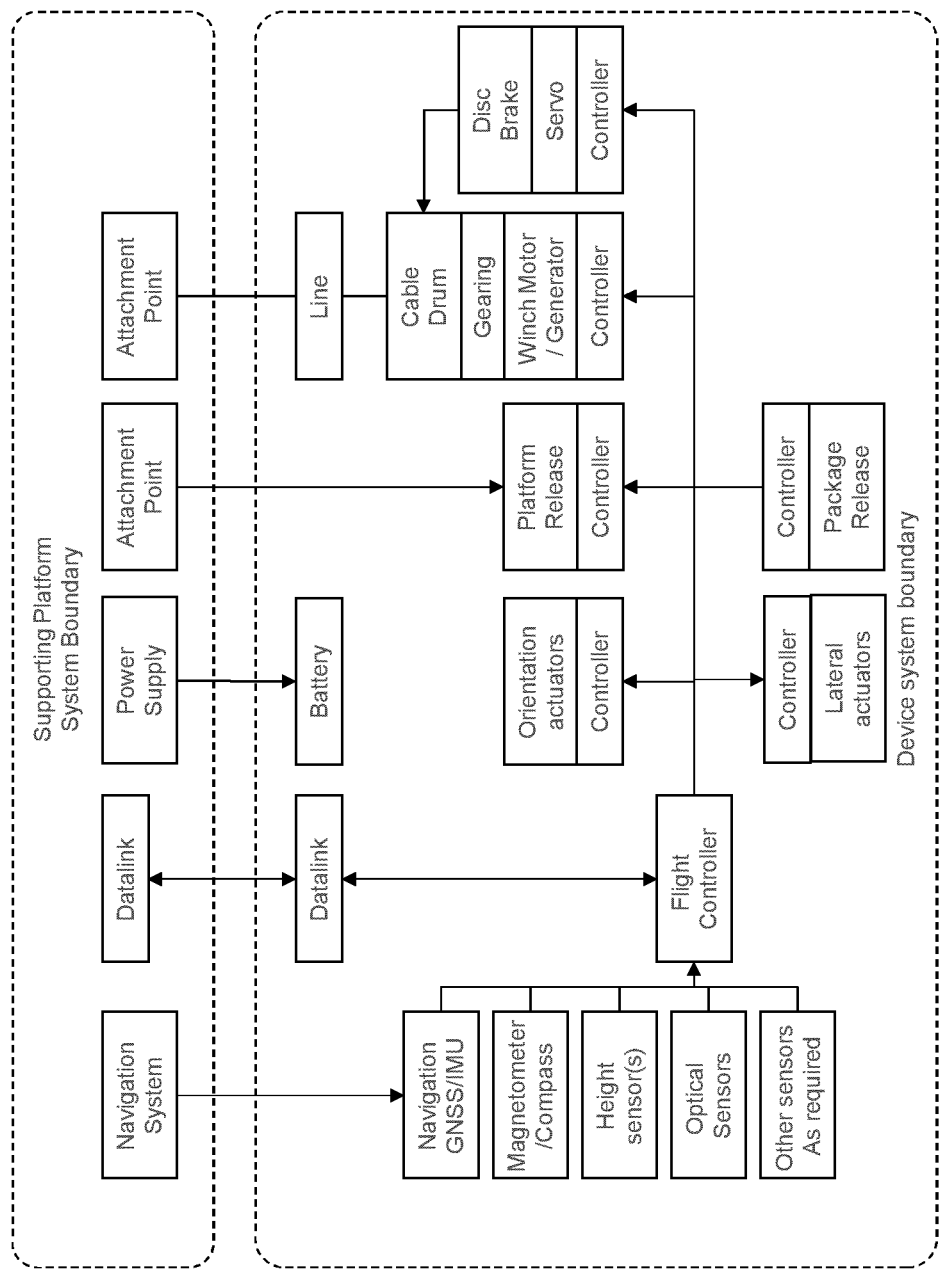

FIG. 18 shows an example system diagram.

Features of other aspects and embodiments may include one or more of the following.

1. Vertical pick-up/drop-off from an aerial platform in forward flight, avoiding requirement to hover.
2. Pick up, hold, and drop off.
4. The device may be independent once separated from the aerial platform. A laser range finder (LRF) and/or height sensor measures height above ground and controls hauling means such as a winch without need to communicate with the aerial platform.
5. An aerial platform from which the device is suspended could, for example, wait for the device to return, or make assumption drop is complete after an appropriate time period and then continue en-route while the device rewinds up line.
6. The device may be independent once separated from aerial platform and not reliant on constant communication between the two.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A transport device suspended or suspendable from an aerial platform for delivering and/or collecting and/or moving and/or holding a payload using a line having an aerial platform end connected to the aerial platform and a payload end opposite the aerial platform end, the transport device is located at the payload end of the line and comprises a primary hauling mechanism that includes an onboard winch which controls vertical movement of the transport device and payload relative to the aerial platform by letting out or pulling in the line between the transport device and the aerial platform, the line is suspended or suspendable from the aerial platform, the transport device also comprises a multi-directional propulsion system to control horizontal movement of the transport device and payload.

2. The transport device as claimed in claim 1, in which a payload will be fixed directly to the transport device, underslung beneath the transport device, or deployed from the transport device.

3. The transport device as claimed in claim 2, in which the onboard winch is the only control of the vertical movement of the transport device and payload relative to the aerial platform.

4. The transport device as claimed in claim 1, comprising a braking system.

5. The transport device as claimed in claim 1, in which the propulsion system also controls orientation of the device.

6. The transport device as claimed in claim 1, in which the propulsion system comprises one or more rotors, fans, vanes, jet engines or rockets.

7. The transport device as claimed in claim 6, comprising three or four evenly spaced, sideways facing rotors.

8. The transport device as claimed in claim 7, in which the propulsion system comprises tilted rotors which are tilted for control of lateral orientation.

9. The transport device as claimed in claim 1, in which the transport device comprises one or more on-board sensors selected from the group consisting of: acoustic, vibration, chemical, electric current, electric potential, magnetic, radio, air flow, environment, weather, terrain recognition, moisture, humidity, navigation instruments, position, angle, displacement, distance, speed, acceleration, optical, light, imaging, photon, pressure, level, thermal, heat, temperature, proximity, ground proximity, presence, speed sensor, visual, audio, range finder; LIDAR; RADAR; SONAR; electro-optical, or ultra-sonic.

10. The transport device as claimed in claim 1, in which the line is a cable, rope, wire or chain.

11. The transport device as claimed in claim 1, in which the propulsion system is a multi-directional propulsion system comprising propellers and motors arranged in one of the following ways: two or more propellers fixed within the device pointing to provide thrust in fixed directions; one or more propellers with the ability to swivel to provide thrust in different directions; four fixed rotors arranged at approximately 90 degrees to each other, or one or more propellers providing thrust that is directed through vents to direct thrust in different directions.

12. The transport device as claimed in claim 1 and comprising onboard power.

13. The transport device as claimed in claim 1 and comprising local computing means which: processes and analyses on-device sensor signals; and/or host control algorithms; and/or generate demand signals for device actuators to demand lateral/vertical motion as required.

14. A transport system comprising an aerial platform and one or more transport devices as claimed in claim 1.

15. The transport system as claimed in claim 14, in which the one or more transport devices can transport one or multiple payloads.

16. The transport system as claimed in claim 14 for use with a payload, in which the payload is selected from the group consisting of: a package; a container; sensors; supplies; a person; an animal.

17. The transport system as claimed in claim 14 further comprising open or closed passenger pods/seating and/or a harness to transport people and/or animals.

18. The transport system as claimed in claim 14, in which the aerial platform is selected from the group consisting of: unmanned; manned; a UAV; a UAS; a rotor craft; a fixed wing aerial platform; a motor-glider; a paraglider; a hang glider; helicopter;
   gyrocopter; rotary wing vehicle; paramotor; tri-copter; quadcopter; octocopter; hybrid VTOL.

19. A drone delivery system comprising a device as claimed in claim 1 or a transport system as claimed in claim 14.

\* \* \* \* \*